(12) United States Patent
Chang et al.

(10) Patent No.: US 12,347,997 B2
(45) Date of Patent: *Jul. 1, 2025

(54) METHODS AND SYSTEMS FOR ALIGNING MASTER OSCILLATOR POWER AMPLIFIER SYSTEMS

(71) Applicant: Taiwan Semiconductor Manufacturing Co., Ltd., Hsinchu (TW)

(72) Inventors: Chun-Lin Louis Chang, Hsinchu County (TW); Henry Tong Yee Shian, Hsinchu (TW); Alan Tu, Zhubei (TW); Han-Lung Chang, Hsinchu (TW); Tzung-Chi Fu, Miaoli County (TW); Bo-Tsun Liu, Taipei (TW); Li-Jui Chen, Hsinchu (TW); Po-Chung Cheng, Chiayi County (TW)

(73) Assignee: TAIWAN SEMICONDUCTOR MANUFACTURING CO., LTD., Hsinchu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,199

(22) Filed: Apr. 26, 2024

(65) Prior Publication Data

US 2024/0297476 A1   Sep. 5, 2024

Related U.S. Application Data

(60) Continuation of application No. 18/171,609, filed on Feb. 20, 2023, now Pat. No. 11,973,302, which is a
(Continued)

(51) Int. Cl.
*H01S 3/104*   (2006.01)
*H01S 3/00*   (2006.01)
(Continued)

(52) U.S. Cl.
CPC ............ *H01S 3/104* (2013.01); *H01S 3/1001* (2019.08); *H01S 3/2316* (2013.01); *H05G 2/008* (2013.01);
(Continued)

(58) Field of Classification Search
None
See application file for complete search history.

(56) References Cited

U.S. PATENT DOCUMENTS 4,939,739 A * 7/1990 Hobart .................... H01S 3/139
372/98
4,955,725 A   9/1990 Johnson
(Continued)

FOREIGN PATENT DOCUMENTS

CA      2504691 C      5/2004
CN   107735914 A      2/2018
(Continued)

*Primary Examiner* — Joshua King
(74) *Attorney, Agent, or Firm* — HAYNES AND BOONE, LLP

(57) ABSTRACT

The present disclosure provides a method for aligning a master oscillator power amplifier (MOPA) system. The method includes ramping up a pumping power input into a laser amplifier chain of the MOPA system until the pumping power input reaches an operational pumping power input level; adjusting a seed laser power output of a seed laser of the MOPA system until the seed laser power output is at a first level below an operational seed laser power output level; and performing a first optical alignment process to the MOPA system while the pumping power input is at the operational pumping power input level, the seed laser power output is at the first level, and the MOPA system reaches a steady operational thermal state.

20 Claims, 9 Drawing Sheets

Related U.S. Application Data division of application No. 16/165,022, filed on Oct. 19, 2018, now Pat. No. 11,588,293.

(60) Provisional application No. 62/589,198, filed on Nov. 21, 2017.

(51) Int. Cl.

| | |
|---|---|
| *H01S 3/04* | (2006.01) |
| *H01S 3/041* | (2006.01) |
| *H01S 3/10* | (2006.01) |
| *H01S 3/1123* | (2023.01) |
| *H01S 3/223* | (2006.01) |
| *H01S 3/23* | (2006.01) |
| *H05G 2/00* | (2006.01) |

(52) U.S. Cl.
CPC ............. *H01S 3/005* (2013.01); *H01S 3/0407* (2013.01); *H01S 3/041* (2013.01); *H01S 3/10038* (2013.01); *H01S 3/10069* (2013.01); *H01S 3/1123* (2023.01); *H01S 3/2232* (2013.01)

(56) References Cited

U.S. PATENT DOCUMENTS

| | | | |
|---|---|---|---|
| 5,001,718 A | 3/1991 | Burrows | |
| 5,151,909 A * | 9/1992 | Davenport | H01S 3/117 359/328 |
| 5,450,436 A | 9/1995 | Mizoguchi | |
| 5,500,866 A | 3/1996 | Goethals | |
| 5,642,374 A * | 6/1997 | Wakabayashi | H01S 3/134 372/57 |
| 6,700,916 B1 | 3/2004 | Kramer | |
| 7,756,170 B2 | 7/2010 | Almoric | |
| 8,796,666 B1 | 8/2014 | Huang | |
| 8,841,047 B2 | 9/2014 | Yu | |
| 8,877,409 B2 | 11/2014 | Hsu | |
| 9,093,530 B2 | 7/2015 | Huang | |
| 9,184,054 B1 | 11/2015 | Huang | |
| 9,256,123 B2 | 2/2016 | Shih | |
| 9,529,268 B2 | 12/2016 | Chang | |
| 9,570,877 B1 | 2/2017 | Ammann | |
| 9,548,303 B2 | 7/2017 | Lee | |
| 9,869,934 B2 | 1/2018 | Huang | |
| 9,869,939 B2 | 1/2018 | Yu | |
| 9,882,343 B2 | 1/2018 | Moriya | |
| 10,256,592 B1 | 4/2019 | Perryman | |
| 2001/0012311 A1 | 8/2001 | Atsumi | |
| 2001/0040720 A1 * | 11/2001 | Gerrish | H01S 3/10013 359/341.41 |
| 2001/0040721 A1 * | 11/2001 | Gerrish | H04B 10/2912 359/341.41 |
| 2002/0163942 A1 * | 11/2002 | Baillargeon | H01S 3/1303 372/20 |
| 2002/0196823 A1 * | 12/2002 | Nakao | H01S 3/10092 372/32 |
| 2004/0037340 A1 | 2/2004 | Yanagisawa | |
| 2005/0185690 A1 * | 8/2005 | Rule | H01S 3/2366 372/89 |
| 2007/0213697 A1 | 9/2007 | Holliday | |
| 2008/0198882 A1 | 8/2008 | Clar | |
| 2009/0299693 A1 * | 12/2009 | Kane | H01S 3/0014 702/179 |
| 2010/0097602 A1 | 4/2010 | Lafortune | |
| 2011/0147566 A1 | 6/2011 | Furuya | |
| 2011/0235663 A1 * | 9/2011 | Akins | G03F 7/70975 372/38.01 |
| 2011/0249691 A1 | 10/2011 | O'Brien | |
| 2011/0249692 A1 * | 10/2011 | Honea | G02B 6/02366 372/29.011 |
| 2012/0236885 A1 * | 9/2012 | Watanabe | H01S 3/2316 372/31 |
| 2014/0251964 A1 | 9/2014 | Rowlette | |
| 2014/0348188 A1 | 11/2014 | Suganuma | |
| 2015/0138631 A1 | 5/2015 | Russin | |
| 2015/0372441 A1 | 12/2015 | Honda | |
| 2017/0059711 A1 * | 3/2017 | Stysley | B64G 1/1021 |
| 2018/0017875 A1 * | 1/2018 | Bibby | G03F 7/70975 |
| 2018/0254609 A1 | 9/2018 | Filgas | |
| 2018/0375283 A1 | 12/2018 | Kurosawa | |
| 2019/0157833 A1 | 5/2019 | Suganuma | |

FOREIGN PATENT DOCUMENTS

| | | | | |
|---|---|---|---|---|
| DE | 60017576 T2 * | 12/2005 | ........... | H01S 3/2341 |
| JP | H0797672 B2 * | 10/1995 | | |
| JP | 2001168804 A * | 6/2001 | | |
| JP | 2004519702 A * | 7/2004 | | |
| JP | 3773858 B2 * | 5/2006 | ......... | G03F 7/70975 |
| JP | 2013535824 A * | 9/2013 | | |
| KR | 20180113558 A * | 10/2018 | | |
| KR | 20200089055 A | 7/2020 | | |
| WO | WO-2005083851 A2 * | 9/2005 | ............. | H01S 3/042 |
| WO | 2013144695 A1 | 10/2013 | | |
| WO | 2016002648 A1 | 1/2016 | | |
| WO | 2017009945 A1 | 1/2017 | | |
| WO | 2017149712 A1 | 9/2017 | | |
| WO | WO-2019086794 A1 * | 5/2019 | ......... | B23K 26/0604 |
| WO | WO-2021091592 A1 * | 5/2021 | ......... | G01N 15/0205 |

* cited by examiner

METHODS AND SYSTEMS FOR ALIGNING MASTER OSCILLATOR POWER AMPLIFIER SYSTEMS

PRIORITY DATA

This application is a continuation application of U.S. patent application Ser. No. 18/171,609, filed Feb. 20, 2023, which is a divisional application of U.S. patent application Ser. No. 16/165,022, filed Oct. 19, 2018, which claims priority to U.S. Provisional Patent Application Ser. No. 62/589,198, filed Nov. 21, 2017, each of which is hereby incorporated herein by reference in its entirety.

BACKGROUND

The electronics industry has experienced an ever increasing demand for smaller and faster electronic devices which are simultaneously able to support a greater number of increasingly complex and sophisticated functions. Accordingly, there is a continuing trend in the semiconductor industry to manufacture low-cost, high-performance, and low-power integrated circuits (ICs). Thus far these goals have been achieved in large part by scaling down semiconductor IC dimensions (e.g., minimum feature size) and thereby improving production efficiency and lowering associated costs. However, such scaling has also introduced increased complexity to the semiconductor manufacturing process. Thus, the realization of continued advances in semiconductor ICs and devices calls for similar advances in semiconductor manufacturing processes and technology.

For example, semiconductor lithography processes may use lithographic templates (e.g., photomasks or reticles) to optically transfer patterns onto a substrate. Such a process may be accomplished by projection of a radiation source, through an intervening photomask or reticle, onto the substrate having a photosensitive material (e.g., photoresist) coating. The minimum feature size that may be patterned by way of such a lithography process is limited by the wavelength of the projected radiation source. In view of this, extreme ultraviolet (EUV) light sources and lithographic processes have been introduced.

One of the methods to generate EUV radiation involves use of a high-power laser source such as a master oscillator power amplifier system (MOPA). A MOPA system includes a seed laser as a master oscillator and several power amplifiers including high gain preamplifiers as pre-amplifier and high efficiency power amplifiers as power amplifiers. In order to achieve the maximum output power, a MOPA for EUV generation requires alignment to provide focused laser pulses. Due to the limited optical efficiency of the power amplifiers, a large amount of energy input into the amplifiers become heat that can change the refractive index of all gaseous and solid medium through which the laser radiation passes, resulting in a phenomenon commonly referred to as "thermal lensing." Thermal lensing causes the laser beam from the MOPA system to drift, giving rise to reduction of laser power output and safety issues. Therefore, there is a great deal of interests in methods and systems for efficiently and safely align MOPA systems.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
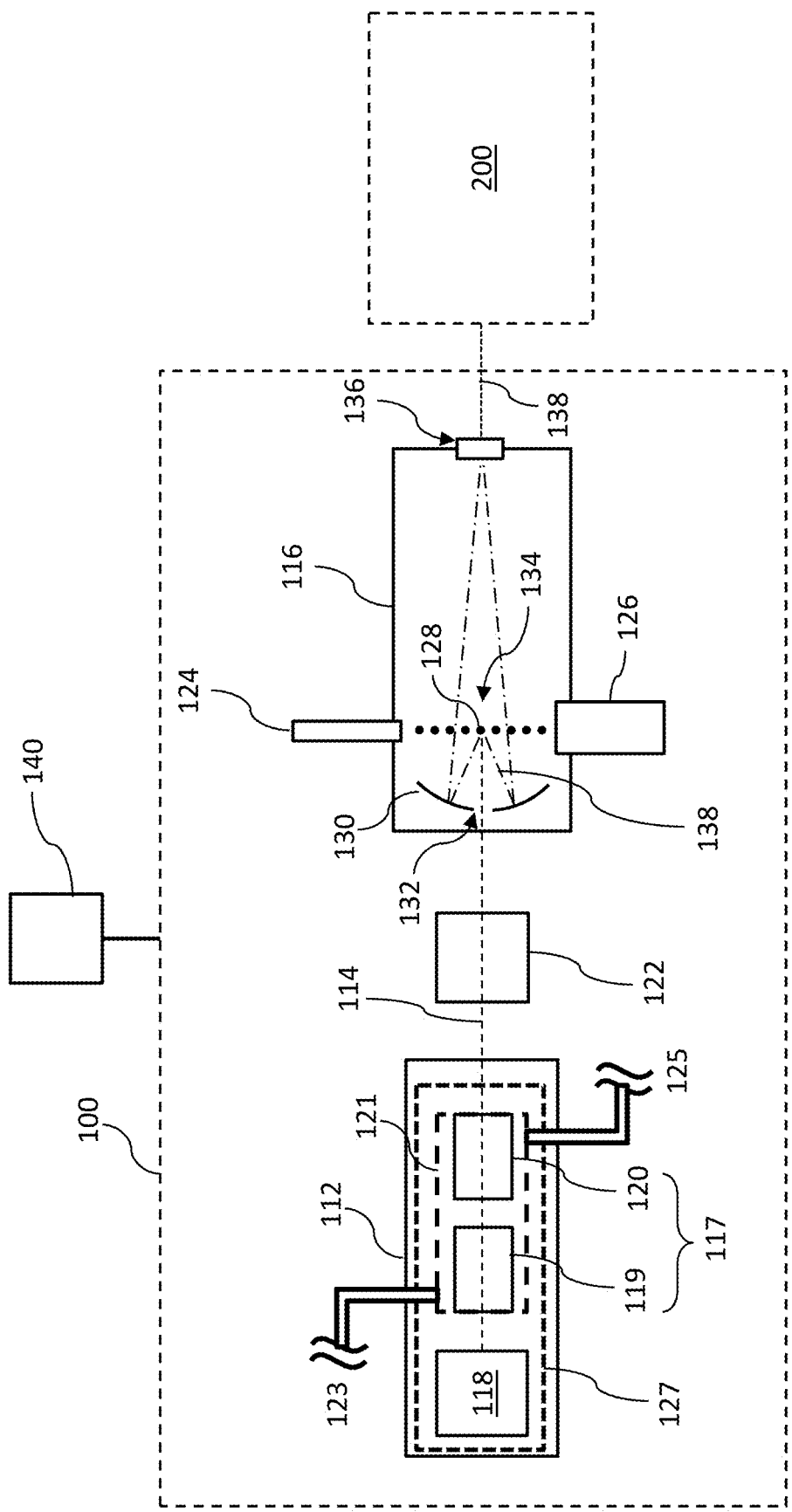
FIG. 1 is a schematic diagrammatic view of an EUV light (also referred to as EUV radiation) source system, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Additionally, throughout the present disclosure, the terms "mask", "photomask", and "reticle" may be used interchangeably to refer to a lithographic template, such as an EUV mask.

As the minimum feature size of semiconductor integrated circuits (ICs) has continued to shrink for better performance and cost-effectiveness, there has continued to be a great interest in photolithography systems and processes using radiation sources with shorter wavelengths. In view of this, extreme ultraviolet (EUV) light sources, processes, and systems have been developed. Methods to produce EUV light include, but are not necessarily limited to, converting a material into a plasma state that has an element (e.g., xenon, lithium, or tin) with an emission wavelength in the EUV spectrum. In one such method, often termed laser produced plasma (LPP), the required EUV light can be produced by irradiating a target material, for example in the form of a droplet, with a laser beam emitted from a laser system. In accordance with its various embodiments, the present disclosure is generally related to systems and methods for preparing and aligning components in the laser system to reduce beam drifting due to thermal lensing effect.

Referring to FIG. 1, illustrated therein is a schematic view of a EUV light generation system 100. The EUV light generation system 100 is illustrative of an exemplary system that creates EUV wavelength radiation, which can be delivered to a EUV lithography system 200, which will be further described later in FIG. 2. In some embodiments, the EUV light generation system 100 is embedded in and is integrated as a part of the EUV lithography system 200. In some embodiments, a EUV light generation system 100 may include a laser produced plasma (LPP) EUV light source. Thus, as shown and in some embodiments, the EUV light generation system 100 may include a laser system 112 for generating and delivering a laser beam 114 to a EUV vessel 116.

The laser beam 114 may be a series of pulses. In some embodiments, the laser beam 114 includes one or more main pulses, and/or one or more pre-pulses. Suitable lasers generated by the laser system 112 may include KrF, ArF, $CO_2$ lasers, and other appropriate lasers. As an example, the laser system 112 may include a pulse laser device (e.g., a pulsed gas-discharge $CO_2$ laser device) producing a laser radiation at 9.2 um or 10.6 um, with direct-current (DC) or (radio frequency) RF excitation, operating at a relatively high power (e.g., 20 KW or higher) and a high pulse repetition rate (e.g., 50 KHz or more) with a pulse width from about 30 ns to about 100 ns.

In the illustrated embodiment, the laser system 112 has a master oscillator power amplifier (MOPA) configuration, which includes a master oscillator (MO) 118 as a seed laser source and multiple stages of pre-amplifier 119 and power amplifier (PA) 120. For that reason, the laser system 112 can be referred to as a MOPA system 112. The MOPA configuration can be used for power and energy scaling in a laser system, as well as to control each stage separately, such that the required energy, power and efficiency can be optimized. Using a master oscillator 118, for example, the laser beam 114 with an extremely tight spectrum may be generated for high-numerical-aperture lenses at low pulse energy. Using a power amplifier 120, for example, the laser beam 114 can be further amplified, in order to deliver the EUV power levels necessary for the high wafer throughput. The master oscillator 118 is also referred to as the seed laser 118 because the laser beam 114 shares many properties with the output of the seed laser 118. In a particular embodiment, the seed laser 118 is a Q-switched laser, which can emit energetic pulsed beam at change of the quality factor of the optical resonator. The preamplifier 119 and power amplifier 120 are also referred to as the laser amplifiers 117 or laser amplifier chain 117 and can be powered electromagnetically. In a particular embodiment, the laser amplifier chain 117 is an RF pumped, fast axial flow, $CO_2$ laser amplifier, where fast axial flow refers to high gas mixture flow rate along a longitudinal direction of a discharge tube.

The state-of-the-art laser amplifier chain 117 still suffers from low optical efficiency and as much as 95% or more of the power input into the laser amplifiers 117 becomes heat. To dissipate this heat and to cool the laser amplifiers 117, the MOPA system 112, in some embodiments, includes a cooling vessel 121 that surrounds some surfaces of the laser amplifiers 117. In some embodiments, a coolant flows through the cooling vessel 121 to cool the laser amplifiers 117. In those embodiments, the coolant enters the cooling vessel 121 via a coolant inlet 123 and exits the cooling vessel 121 via a coolant outlet 125. The coolant can be water, an aqueous solution of organic compounds, an organic solvent, a mixture of organic solvents, mineral oil, or synthetic oil. In some implementations, the coolant exiting the cooling vessel 121 can flow to a heat exchanger (not shown) where the coolant gives up heat before it enters the cooling vessel 121 via the coolant inlet 123. A cooling system including the cooling vessel 121 and the heat exchanger can be a closed system where the coolant gains heat from the laser amplifiers 117 and loses heat to the heat exchanger. In some embodiments, when the coolant flow rate exiting the cooling vessel 121 is fixed, coolant temperature at the coolant outlet 125 can serve as an indication of the macro thermal state of the laser amplifiers 117 or the MOPA system 112. For example, a substantially steady coolant temperature at the coolant outlet 125 over a period of time can indicate that the MOPA system 112 has reached its steady thermal state. In some instances, after the MOPA system 112 reaches a steady thermal state, if the power input into the laser amplifiers 117 increases, it can take 10 to 40 minutes before the coolant temperature at the coolant outlet 125 reaches a new steady temperature, indicating a new steady thermal state of the MOPA system 112.

In some embodiments, the MOPA system 112 includes a safety interlock system 127. The safety interlock system 127 can include a plurality of interlock mechanisms that can be activated or triggered by an event that is considered hazardous by a user or under government regulations. In some implementations, the safety interlock system 127 can shut the MOPA system 112 down if any of its interlock mechanisms is triggered. In some embodiments, the safety interlock system 127 includes temperature sensors that are arrangement in a shape of a ring. The ring of temperature sensors, sometimes referred to as an aperture ring, can be positioned along the path of the laser beam from MOPA system 112 to EUV vessel 116. In some implementations, if one or more of temperature sensors in the ring of temperature sensors deviates from a rolling average temperature by a predetermined extent, the safety interlock system 127 can be triggered to shut down the MOPA system 112. After the MOPA system 112 is shut down for parts swap or upgrade or system adjustment, it can take hours or even days for the MOPA system 112 to be operational again. In the semiconductor manufacturing industry, any gap in manufacturing can be costly due to loss of production capacity, increase of opportunity cost, and scrapping of possible below-standard products. For that reasons, any unplanned activation of the safety interlock system 127 is highly undesirable.

In the EUV light generation system 100, the laser beam 114 may then be directed, by a beam transport and/or focus system 122, to the EUV vessel 116. The path along which the laser beam 114 travels through from the seed laser 118 into the EUV vessel 116 is defined as the laser beam path. The chamber represented by the box 122 of FIG. 1 may include various devices to perform various functions including beam transport, beam focusing, beam amplification, and/or other suitable functionality.

In various embodiments, the EUV vessel 116 also includes a droplet generator 124 and a droplet catcher 126. In some cases, the droplet generator 124 provides droplets 128 of a target material (such as tin or a tin compound, discussed further below) into the EUV vessel 116.

The EUV vessel 116 may include one or more optical elements such as a collector 130. In some embodiments, the collector 130 may include a normal incidence reflector, for example, implemented as a multilayer mirror (MLM). For example, the collector 130 may include a silicon carbide (SiC) substrate coated with a Mo/Si multilayer. In some cases, one or more barrier layers may be formed at each interface of the MLM, for example, to block thermally-induced interlayer diffusion. In some examples, other substrate materials may be used for the collector 130 such as Al, Si, or other type of substrate materials. The collector 130 may be an ellipsoid-shape with an aperture (or opening) 132 at the center to allow the laser beam 114 to pass through and reach an irradiation region 134. Thus, in some embodiments, the laser beam 114 passes through the aperture 132 of the collector 130 and irradiates droplets 128 generated by the droplet generator 124, thereby producing plasma at the irradiation region 134. In some embodiments, the collector 130 may have a first focus at the irradiation region 134 and a second focus at an intermediate focus region 136. By way of example, the plasma generated at the irradiation region 134 produces EUV radiation 138 collected by the collector 130 and output from the EUV vessel 116 through the intermediate focus region 136. From there, the EUV radiation 138 may be transmitted to an EUV lithography system 200 for processing of a semiconductor substrate. The generated EUV radiation 138 is an electromagnetic radiation having wavelengths of around 50 nm or less (also sometimes referred to as soft x-rays). In an embodiment, the EUV radiation 138 includes a wavelength centered around about 13.5 nm.

Figure 2:
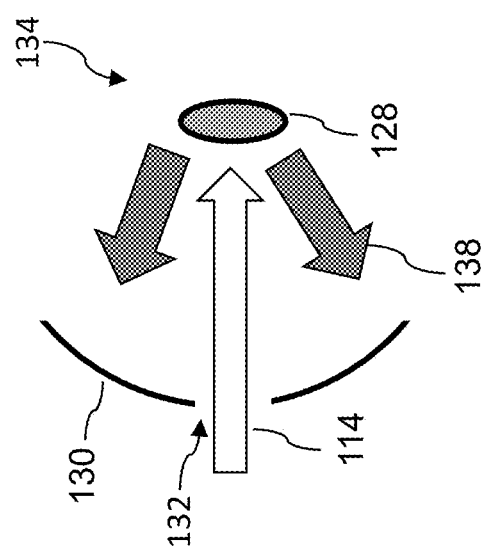
FIG. 2 is an exemplary schematic diagrammatic view of an EUV light source system including a laser beam impacting a target droplet and generation of EUV light, in accordance with some embodiments of the present disclosure.

The interaction between the laser beam 114 and the target droplet 128 is described in greater detail below with reference to FIG. 2. Referring to FIG. 2, illustrated are diagrammatic view of portions of the EUV vessel 116, which provide further details that may be applied to the EUV light generation system 100 of FIG. 1. FIG. 2 shows a diagrammatic view including the collector 130 and an entry of the laser beam 114 through the collector aperture 132 and incident upon a target droplet 128 at the irradiation region 134. The target droplet 128 may be spherical in shape or ellipsoidal in shape. The material of the target droplet 128 may include xenon, lithium, tin, indium, antimony, or tellurium, with an emission line in the EUV spectrum. In one embodiment, the target droplet 128 may include tin or a tin compound. Example compositions include, but are not limited to, tin, SnBr4, SnBr2, SnH4, tin-gallium alloys, tin-indium alloys, tin-indium-gallium alloys or combinations thereof. The target droplet 128 may have a diameter of approximately 10 um to 500 um. Through the amplification from multiple laser amplifiers 117, the laser beam 114 may have a power level ranging from about 10 kW to 40 kW, such as 26 kW in an example, before irradiating the target droplet 128. Upon the irradiation, the material in the target droplet 128 is converted by the laser beam 114 into a plasma state and emits EUV radiation, illustrated as the EUV radiation 138. It is noted that in an exemplary embodiment, the collector 130 may be approximately 24 inches in diameter with a 4 inch diameter aperture 132 in the center. The EUV radiation 138 may be angularly distributed such that it is incident upon the mirror surface of the collector 130. The EUV radiation 138 is further collected and focused by the collector 130 to a focal point, such as the focal region 136 in FIG. 1.

It is noted that in FIG. 2, the target droplet 128 is elliptical (also referred as a "pancake" shape) in the cross-sectional view. In other embodiments, the target droplet 128 may be approximately spherical. The elliptical shape may be provided by introducing a pre-pulse of the laser (e.g., a $CO_2$ laser) from the seed laser 118 prior to the introduction of a main-pulse of the laser beam 114. The pre-pulse may be used to shape the target droplet 128 increasing the available surface area for impact with a subsequent main pulse of the laser beam 114.

Figure 3:
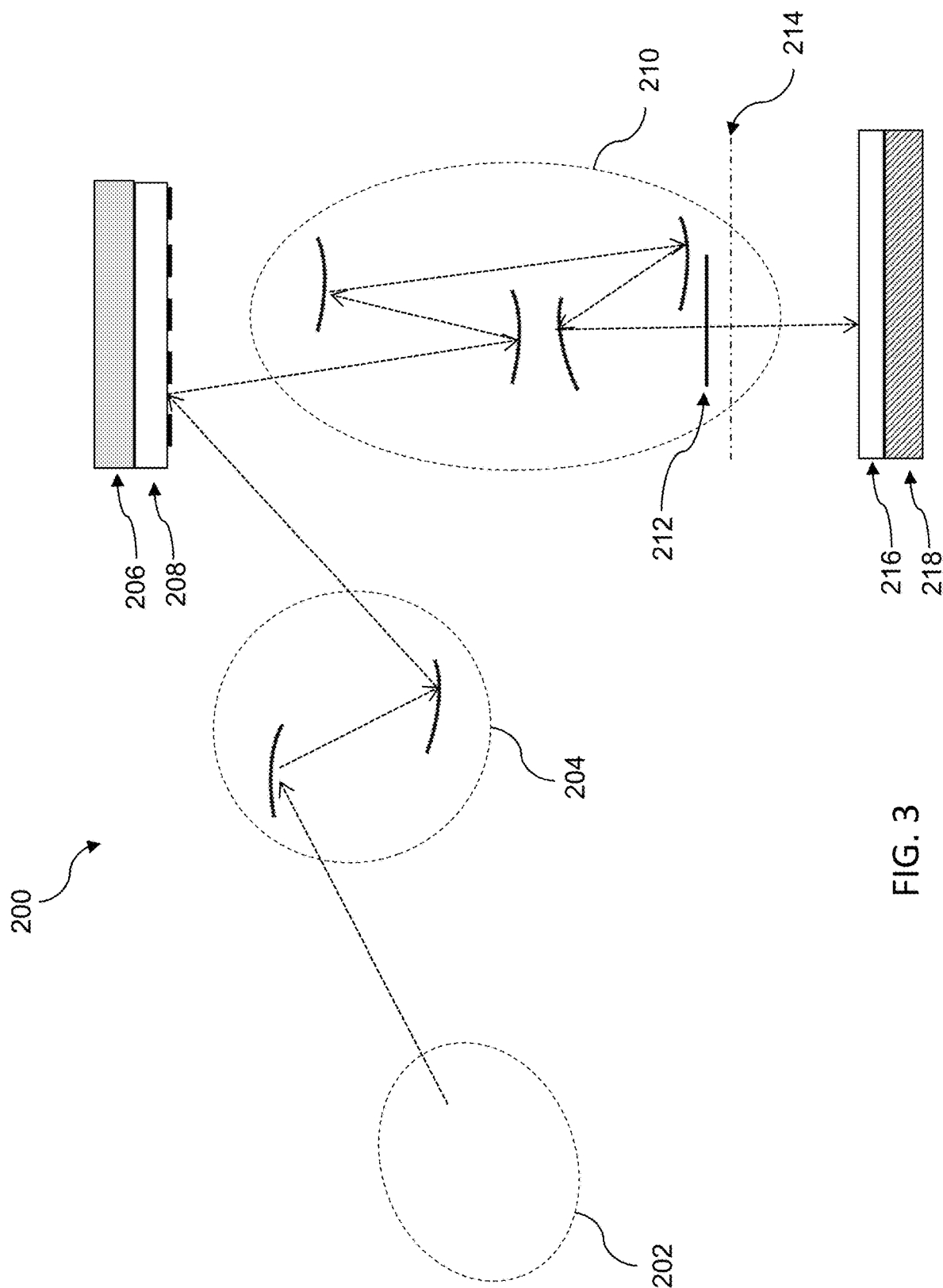
FIG. 3 is a schematic diagrammatic view of a lithography system, in accordance with some embodiments of the present disclosure.

As previously noted, the EUV vessel described above may be used to provide an EUV radiation source for a EUV lithography system 200. By way of illustration, and with reference to FIG. 3, provided therein is a schematic view of an exemplary lithography system 200, in accordance with some embodiments. The lithography system 200 may also be generically referred to as a scanner that is operable to perform lithographic processes including exposure with a respective radiation source and in a particular exposure mode. In at least some of the present embodiments, the lithography system 200 includes an extreme ultraviolet (EUV) lithography system designed to expose a resist layer by EUV light. In various embodiments, the resist layer includes a material sensitive to the EUV light (e.g., an EUV resist). The lithography system 200 of FIG. 3 includes a plurality of subsystems such as a radiation source 202, an illuminator 204, a mask stage 206 configured to receive a mask 208, projection optics 210, and a substrate stage 218 configured to receive a semiconductor substrate 216. A general description of the operation of the lithography system 200 may be given as follows: EUV radiation from the radiation source 202 is directed toward the illuminator 204 (which includes a set of reflective mirrors) and projected onto the reflective mask 208. A reflected mask image is directed toward the projection optics 210, which focuses the EUV light and projects the EUV light onto the semiconductor substrate 216 to expose an EUV resist layer deposited thereupon. Additionally, in various examples, each subsystem of the lithography system 200 may be housed in, and thus operate within, a high-vacuum environment, for example, to reduce atmospheric absorption of EUV light.

In the embodiments described herein, the radiation source 202 may be the EUV light generation system 100 in FIG. 1. As discussed above, the source may generate the EUV light using laser produced plasma (LPP). In some examples, the EUV light may include light having a wavelength ranging from about 1 nm to about 100 nm. In one particular example, the radiation source 202 generates EUV light with a wavelength centered at about 13.5 nm. In some embodiments, the radiation source 202 also includes a collector, which may be used to collect EUV light generated from the plasma source and to direct the EUV light toward imaging optics such as the illuminator 204.

Upon receipt, light from the radiation source 202 is directed toward the illuminator 204. In some embodiments, the illuminator 204 may include reflective optics (e.g., for the EUV lithography system 200), such as a single mirror or a mirror system having multiple mirrors in order to direct light from the radiation source 202 onto the mask stage 206, and particularly to the mask 208 secured on the mask stage 206. In some examples, the illuminator 204 may include a zone plate, for example, to improve focus of the EUV light. In some embodiments, the illuminator 204 may be configured to shape the EUV light passing therethrough in accordance with a particular pupil shape, and including for example, a dipole shape, a quadrapole shape, an annular shape, a single beam shape, a multiple beam shape, and/or a combination thereof. In some embodiments, the illuminator 204 is operable to configure the mirrors (i.e., of the illuminator 204) to provide a desired illumination to the mask 208. In one example, the mirrors of the illuminator 204 are configurable to reflect EUV light to different illumination positions. In some embodiments, a stage prior to the illuminator 204 may additionally include other configurable mirrors that may be used to direct the EUV light to different illumination positions within the mirrors of the illuminator 204. In some embodiments, the illuminator 204 is configured to provide an on-axis illumination (ONI) to the mask 208. In some embodiments, the illuminator 204 is configured to provide an off-axis illumination (OAI) to the mask 208. It should be noted that the optics employed in the EUV lithography system 200, and in particular optics used for the illuminator 204 and the projection optics 210, may include mirrors having multilayer thin-film coatings known as Bragg reflectors. By way of example, such a multilayer thin-film coating may include alternating layers of Mo and Si, which provides for high reflectivity at EUV wavelengths (e.g., about 13 nm).

As discussed above, the lithography system 200 also includes the mask stage 206 configured to secure the mask 208. Since the lithography system 200 may be housed in, and thus operate within, a high-vacuum environment, the mask stage 206 may include an electrostatic chuck (e-chuck) to secure the mask 208. As with the optics of the EUV lithography system 200, the mask 208 is also reflective. As illustrated in the example of FIG. 3, light is reflected from the mask 208 and directed towards the projection optics 210, which collects the EUV light reflected from the mask 208. By way of example, the EUV light collected by the projection optics 210 (reflected from the mask 208) carries an image of the pattern defined by the mask 208. In various embodiments, the projection optics 210 provides for imaging the pattern of the mask 208 onto the semiconductor substrate 216 secured on the substrate stage 218 of the lithography system 200. In particular, in various embodiments, the projection optics 210 focuses the collected EUV light and projects the EUV light onto the semiconductor substrate 216 to expose an EUV resist layer deposited on the semiconductor substrate 216. As described above, the projection optics 210 may include reflective optics, similar to those used in the illuminate 204. In some embodiments, the illuminator 204 and the projection optics 210 are collectively referred to as an optical module of the lithography system 200.

In some embodiments, the lithography system 200 also includes a pupil phase modulator 212 to modulate an optical phase of the EUV light directed from the mask 208, such that the light has a phase distribution along a projection pupil plane 214. In some embodiments, the pupil phase modulator 212 includes a mechanism to tune the reflective mirrors of the projection optics 210 for phase modulation. For example, in some embodiments, the mirrors of the projection optics 210 are configurable to reflect the EUV light through the pupil phase modulator 212, thereby modulating the phase of the light through the projection optics 210. In some embodiments, the pupil phase modulator 212 utilizes a pupil filter placed on the projection pupil plane 214. By way of example, the pupil filter may be employed to filter out specific spatial frequency components of the EUV light reflected from the mask 208. In some embodiments, the pupil filter may serve as a phase pupil filter that modulates the phase distribution of the light directed through the projection optics 210.

As discussed above, the lithography system 200 also includes the substrate stage 218 to secure the semiconductor substrate 216 to be patterned. In various embodiments, the semiconductor substrate 216 includes a semiconductor wafer, such as a silicon wafer, germanium wafer, silicon-germanium wafer, III-V wafer, or other type of wafer as described above or as known in the art. The semiconductor substrate 216 may be coated with a resist layer (e.g., an EUV resist layer) sensitive to EUV light. EUV resists may have stringent performance standards. In the embodiments described herein, the various subsystems of the lithography system 200, including those described above, are integrated and are operable to perform lithography exposing processes including EUV lithography processes. The lithography system 200 may further include other modules or subsystems which may be integrated with (or be coupled to) one or more of the subsystems or components described herein.

Figure 4:
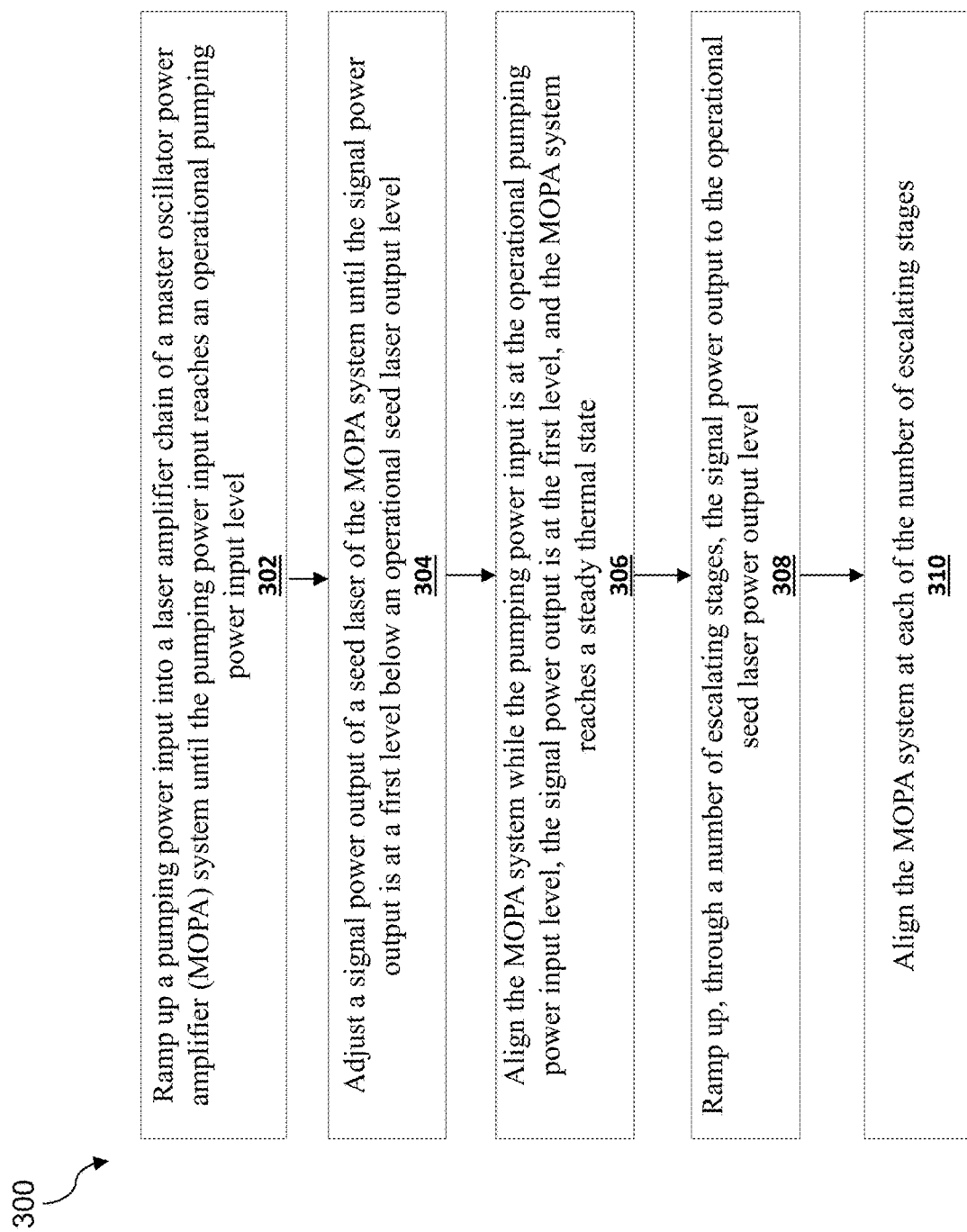
FIG. 4 is a flowchart illustrating a method for aligning a MOPA system, in accordance with some embodiments of the present disclosure.

FIG. 4 is a flowchart illustrating a method 300 for aligning the MOPA system 112 according to various aspects of the present disclosure. The method 300 is merely an example, and is not intended to limit the present disclosure beyond what is explicitly recited in the claims. Additional operations can be provided before, during, and after the method 300, and some of the operations described can be replaced, relocated, or eliminated for other embodiments of the method 300. The method 300 is described below in conjunction with FIGS. 1 and 5.

Figure 5:
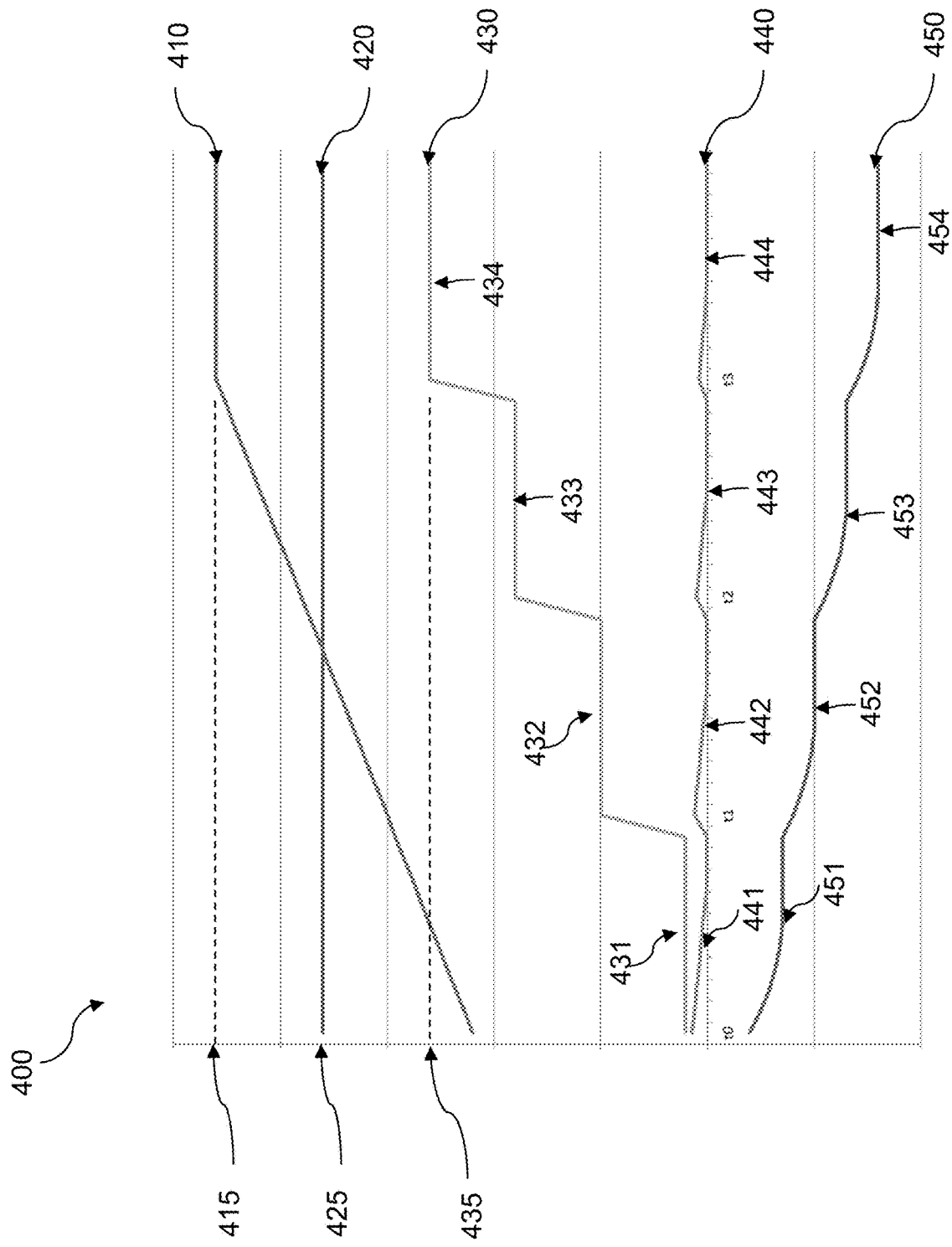
FIG. 5 is a schematic diagram illustrating the changes of power input into the power amplifier, power output of the power amplifier, and the power output of the seed laser over time in the method in FIG. 4, in accordance with some embodiments of the present disclosure.
Figure 8:
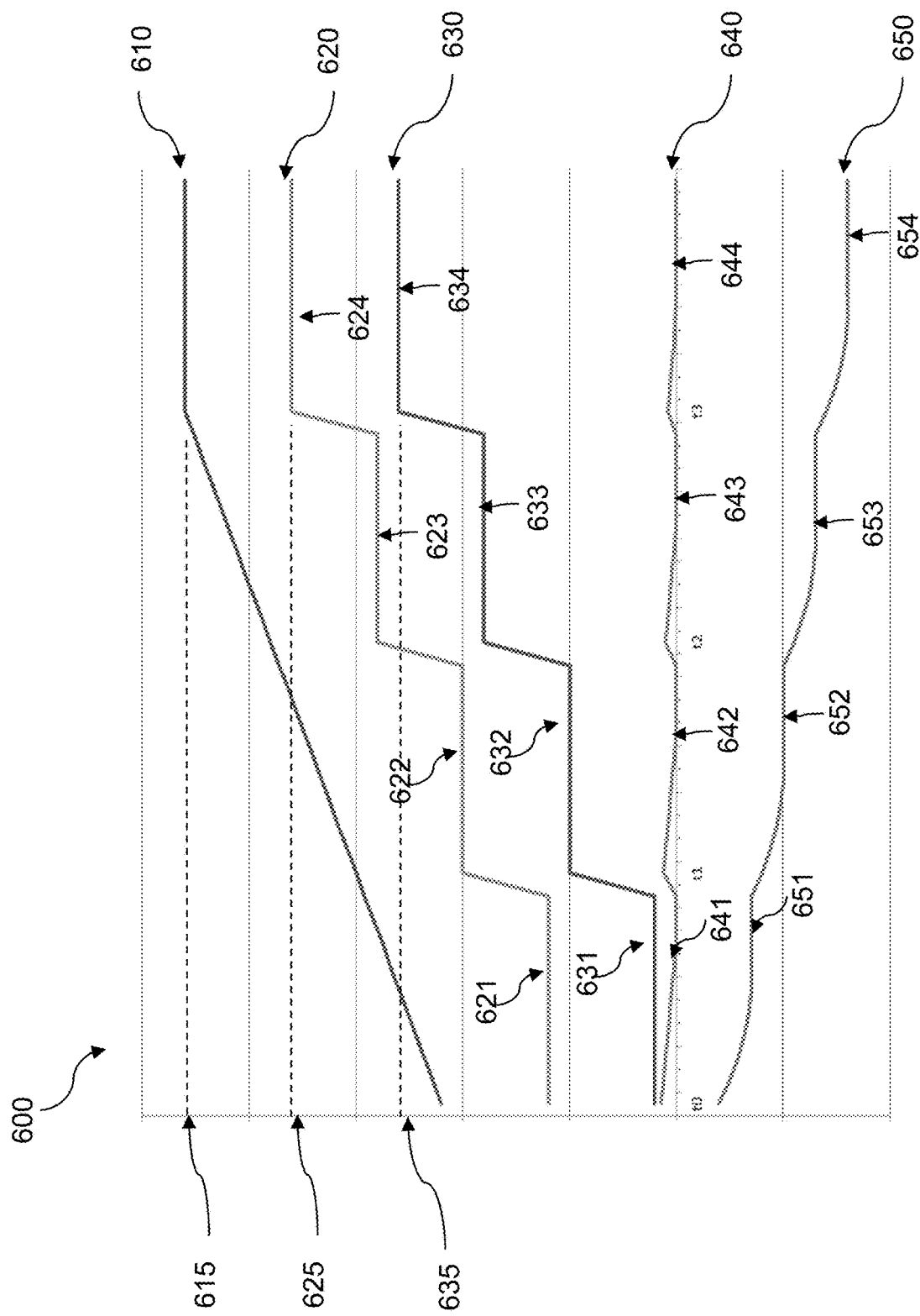
FIG. 8 is a schematic diagram illustrating the changes of power input into the power amplifier, power output of the power amplifier, and the power output of the seed laser over time in the method in FIG. 6, in accordance with some embodiments of the present disclosure.
Figure 9:
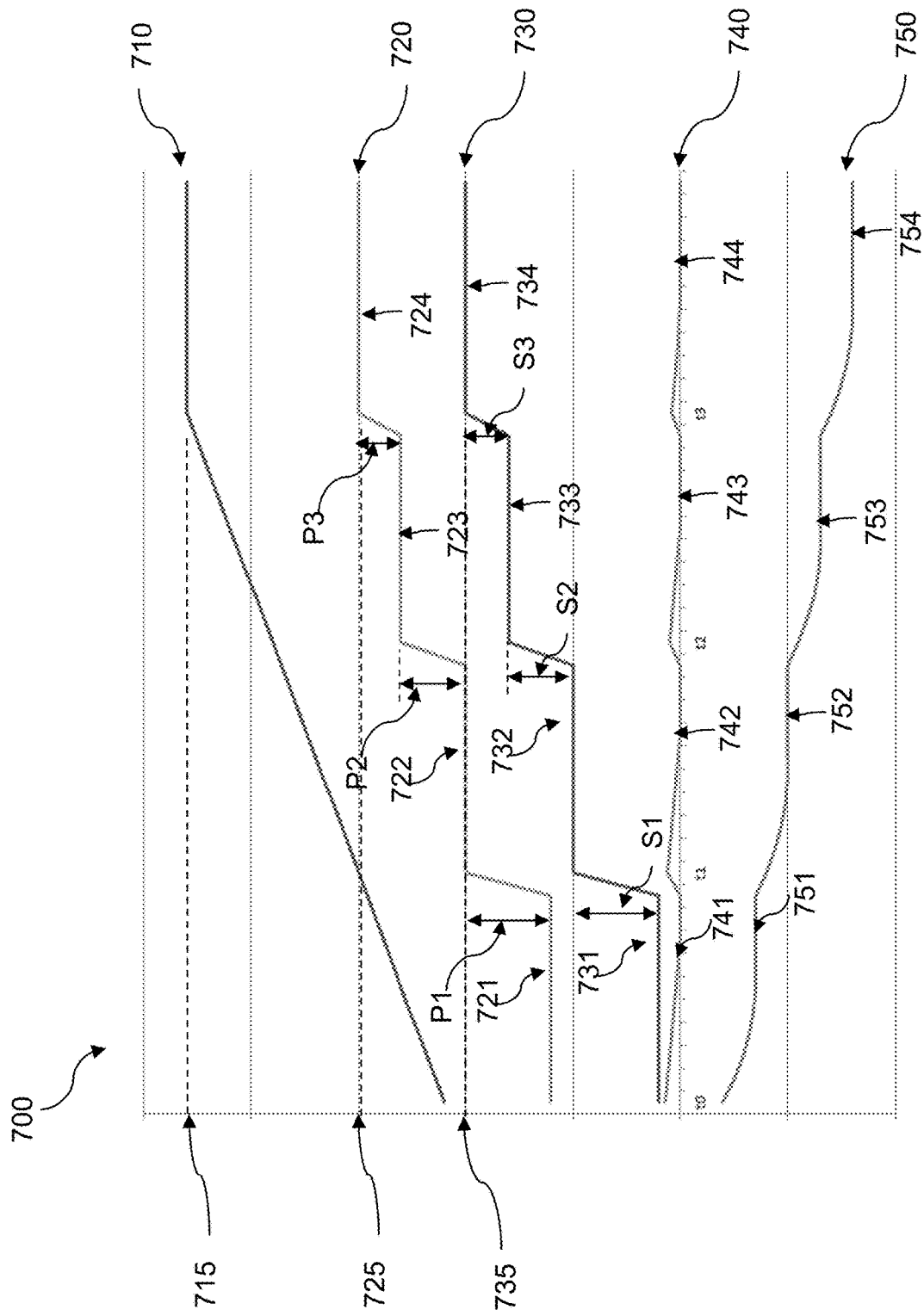
FIG. 9 is a schematic diagram illustrating the changes of power input into the power amplifier, power output of the power amplifier, and the power output of the seed laser over time in the method in FIG. 8, in accordance with some embodiments of the present disclosure.

Reference is now made to FIG. 5, shown therein is a schematic diagram 400 illustrating the changes of pumping power input (represented by line 420) into the laser amplifier chain 117, laser amplifier output (represented by line 410), the signal power output (represented by line 430), amount of misalignment between an aperture of the MOPA system 112 and the laser beam 114 (represented by line 440), and system temperature (e.g. coolant temperature at the coolant outlet 125 in FIG. 1, represented by line 450) of the seed laser 118, during the process of aligning the MOPA system 112 according to method 300 of the present disclosure. Please note that FIG. 5, FIG. 8 and FIG. 9 illustrate qualitative variations of input/output levels, amount of misalignment and system temperature over time and that the vertical axes of FIGS. 5, 8 and 9 are not drawn to scale and do not represent any quantitative relationship among illustrated parameters. The pumping power input into the laser amplifier chain 117 can be in the form of radio frequency (RF) power input, optical power input, direct current (DC) power input, or other forms of electromagnetic power input. In a particular example, the pumping power input can be an RF power input. At operation 302, the method 300 ramps up a pumping power input (represented by line 420) into the laser amplifiers 117 of the MOPA system 112 until the pumping power input 420 is at an operational pumping power input level 425. As shown in FIG. 5, at operation 302 of the method 300, at time $t_0$, the pumping power input 420 into the laser amplifiers 117 experience a step increase to level 425, which is the operational pumping power input into the laser amplifier chain 117. As used herein, the operational pumping power input refers to the level of pumping power input into the laser amplifier chain 117 when the MOPA system 112 is at regular operation. That is, when the EUV light generation system 100 generates EUV radiation under a regular manufacturing condition, the pumping power input into the laser amplifier chain 117 is at the operational pumping power input level— the level 425. In some embodiments, the operational pumping power input level 425 is between 300 kW and 900 kW.

At operation 304 of the method 300, a seed laser power output (also referred to as a signal power output, represented by line 430) of the seed laser 118 of the MOPA system 112 is adjusted until the seed laser power output 430 reaches a first level 431 below an operational seed laser power output level 435. Similar to the operational pumping power input 425 into the laser amplifiers 117, the operational seed laser power output level 435 refers to the signal power output level of the seed laser 118 when the EUV light generation system 100 is fully operational for manufacturing purposes. In some embodiments, the first level 431 is in the mW range. In some instances, the first level 431 is below 100 mW. Compared to the operational seed laser power output level 435, which is between about 100 W and 300 W, the first level 431 is less than about 0.003% or about 0.01% of the operational seed laser power output level 435.

At operation 306, the method 300 aligns the MOPA system 112 while the pumping power input is at the operational pumping power input level 425, the signal power output of the seed laser 118 is at the first level 431, and the MOPA system 112 reaches a steady thermal state. Because the pumping power input is the most substantial source of thermal energy for the MOPA system 112, by turning the pumping power input to its full operational level, the MOPA system 112 can quickly heat up. The heat generated by the pumping power input can be removed by the coolant flowing through the cooling vessel 121. A signal power output from the seed laser 118 can also remove energy from the MOPA system 112 when the excited gain medium coherently transfers energy to photons of the signal power output from the seed laser 118. Line 450 represents the system temperature that, in some instances, can be assessed by measuring the coolant temperature at the coolant outlet 125 of the cooling vessel 121. When the heat generated by the pumping power input is dynamically balanced by the heat removed by the coolant and the coherent energy transfer to the signal power output, the MOPA system 112 is said to have reached a steady thermal state. As shown in FIG. 5, when the signal power output is at the first level 431, the system temperature may experience a change represented by line segment 451. Line segment 451 starts off at a higher level at time $t_0$ and then gradually turns lower due to cooling and energy transfer until it plateaus at a steady state toward the end of the line segment 451. In some embodiments, whether or not the MOPA system 112 reaches a steady thermal state can be identified by measuring the temperature at the coolant outlet 125. For example, when the coolant temperature at the coolant outlet 125 fluctuates within a predetermined range for a predetermined period of time, a controller 140 (FIG. 1) can determine that the MOPA system reaches a steady thermal state. The predetermined range and predetermined period of time can be determined empirically. In an embodiment, the predetermined range has a span of 5 to 10° C. and the predetermined period of time is between 15 minute and 60 minutes. In some implementations represented by FIG. 5, the pumping power input 420 is ramped up to the operational pumping power input level 425. In those implementations, the steady thermal state can be referred to as the steady operational thermal state as the pumping power input is turned to the operational level. The process of aligning the MOPA system 112 according to method 300 can be referred to an optical alignment process. In some embodiments, the optical alignment process is performed by adjusting one or more mirrors, reflectors, or other optical components at both input and output ends of the laser amplifier chain 117.

Figure 6B:
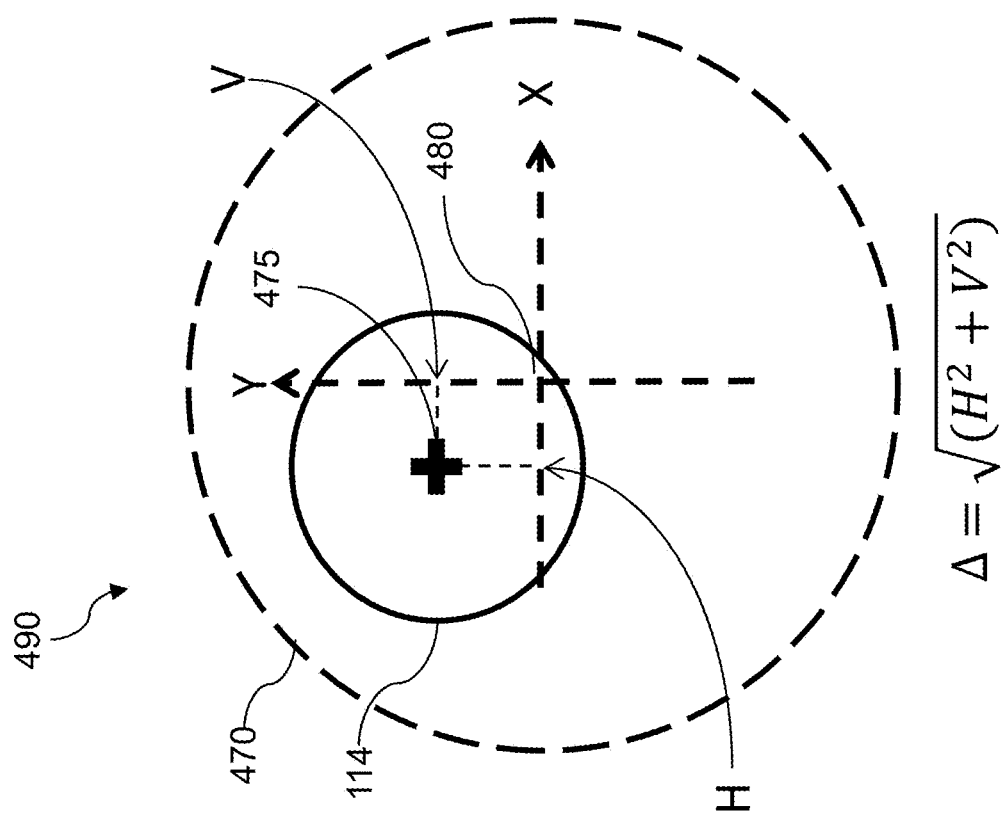
FIGS. 6a and 6b are schematic diagrams illustrating alignments between an aperture and a laser beam of a MOPA system, in accordance with aspects of the present disclosure.
Figure 6A:
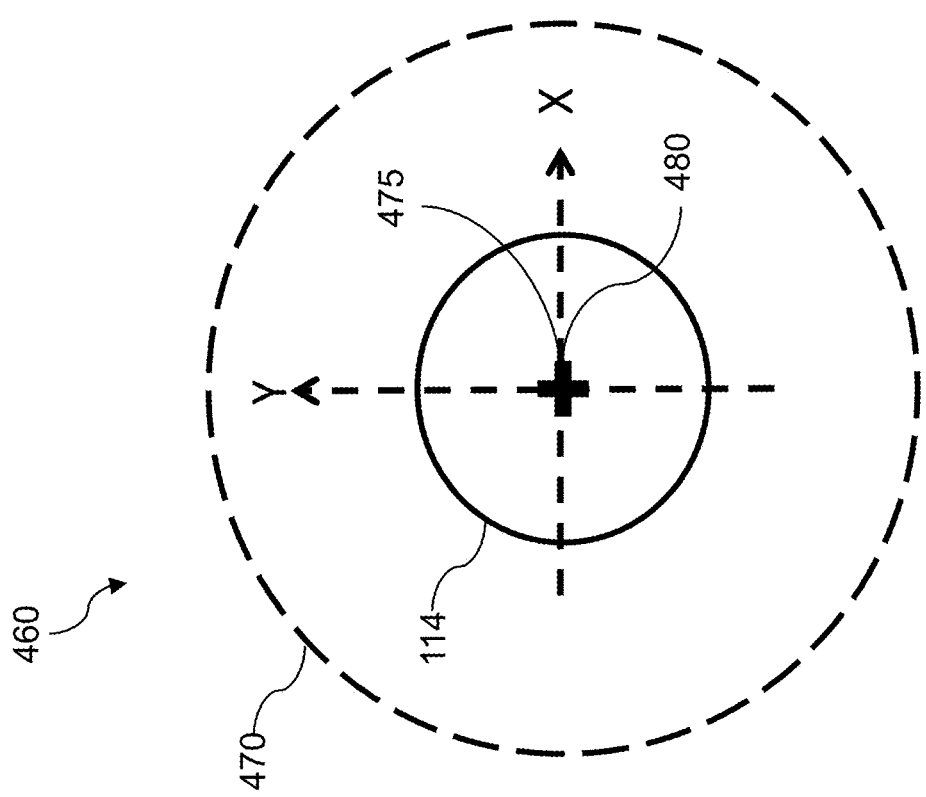

The optical alignment process can be assessed or guided by the alignment between an aperture 470 of the MOPA system 112 and the laser beam 114, which is illustrated in FIGS. 6a and 6b. As used herein and in some embodiments, the aperture 470 of the MOPA system 112 represents a summation of all optical paths and apertures of the MOPA system 112. A perfect alignment between the laser beam 114 and the aperture 470 is illustrated in FIG. 6a, where a center 475 of the laser beam 114 coincides with a center 480 of the aperture 470. FIG. 6b illustrates a misalignment between the laser beam 114 and the aperture 470, where the center 475 of the laser beam 114 does not coincide with the center 480 of the aperture 470. The amount of misalignment between the laser beam 114 and the aperture 470 can be expressed as a separation Δ between the center 475 of the laser beam 114 and the center 480 of the aperture 470. As illustrated in FIG. 6b, the center 475 is shifted from the center 475 by a distance H along the −X direction and by a distance V along the Y direction. The separation Δ may then be mathematically represented as a square root of a sum of a square product of the distance H and the distance V. The goal of the optical alignment process is to achieve the perfect alignment shown in FIG. 6a or an alignment within an acceptable margin of error of the perfect alignment.

The change of the amount of misalignment (i.e. separation Δ) during the process of aligning the MOPA system 112 according to method 300 is represented by line 440 in FIG. 5. At time $t_0$, the MOPA system 112 may not be aligned, as illustrated by line segment 441. In some instances, the MOPA system 112 may be fully aligned when cold (i.e. without any input of the pumping power) but such cold-state alignment cannot be maintained due to thermal lensing as the pumping power input 420 is ramped up to the operational level 425. Referring to line segment 441, the amount of misalignment may gradually drop over time due to cooling by the cooling system and the aforementioned coherent energy transfer. After the MOPA system 112 reaches a steady thermal state, as shown in the right hand portion of line segment 451, the MOPA system 112 may undergo alignment at operation 306 of the method and the amount of misalignment in line segment 441 further drops.

Performing an optical alignment process to the MOPA system 112 when the seed laser power output 430 is at the first level 431 and the pumping power input 420 is at the operational pumping power input level 425 provides benefits. When the pumping power input 420 is at the operational pumping power input level 425, the MOPA system 112 experiences substantially the same level, if not higher, of the "thermal lensing effect" as it is in regular operation. That is, at operation 306 of the method 300, the alignment of the MOPA system 112 takes into consideration the impact of the "thermal lensing effect," namely, the thermally-induced changes in refractive indices of all gases and optical elements in the MOPA system 112. Aligning the MOPA system 112 using the first level 431 of seed laser power output ensures the laser output (also referred to as the laser amplifiers 117 output, represented by line 410) of the MOPA system 112 is at a low level. By ensuring the laser amplifier output level 410 of the MOPA system 112 at a low level, alignment at the operation 306 is less likely to cause abrupt temperature gradients in the laser amplifier 117, reducing the probability of triggering the safety interlock system 127. By reducing the probability to trigger the safety interlock system 127, the alignment at operation 306 can save valuable on-time of the EUV light generation system 100, reducing manufacturing cost and down-time.

At operation 308 of the method 300, the signal power output 430 of the seed laser 118 is ramped up through a number of ascending stages 432, 433 and 434 to an operational seed laser power output level 435. With the pumping power input 420 being ramped up to the operational pumping power input level 425, abrupt increase of the output power 430 of the seed laser 118 to the operational seed laser power output level 435 can result in undesirable level of self-focusing due to transient thermal lensing effect. For that reason, operation 308 of the method 300 advantageously ramps up the signal output power 430 of the seed laser 118 through a number of ascending stages. As shown in FIG. 5, after the MOPA system 112 is allowed to reach the steady operational thermal state and aligned at operation 306, the signal output 430 of the seed laser 118 is increased stage-by-stage at times $t_1$, $t_2$ and $t_3$ to ever higher output levels at stages 432, 433 and 434. In the exemplary embodiment shown in FIG. 5, the signal power output 430 of the seed laser 118 is ramped up through four stages—431, 432, 433 and 434, with the signal output power at stage 431 being at the first level and the that at stage 434 and the operational seed laser power output level 435. In the embodiment represented by FIG. 5, the four stages 431, 432, 433 and 434 are even stages with equal increase of signal power output between stages. However, the present disclosure envisions fewer or more ascending stages. In theory, operation 308 can include any number of ascending stages. Due to practical considerations and to save time, operation 308 can include 3 to 15 ascending stages.

Because higher signal power output from the seed laser 118 extract more energy from the MOPA system 112, the step increases of signal power output 430 over the four stages 431, 432, 433, and 434 may lower the system temperature 450 at the beginning of each corresponding system temperature stages 451, 452, 453, and 454. As shown by line segments 451, 452, 453, and 454, the initial drop of system temperature may be dynamically balanced by the cooling system until the system temperature plateaus toward the ends of each stages.

At operation 310, the method 300 aligns the MOPA system 112 at each of the number of ascending stages. In the exemplary embodiments shown in FIG. 5, the signal power output 430 of the seed laser 118 is ramped up through three stages 432, 433 and 434 in addition to stage 431, and alignment is performed at each of the stages 432, 433 and 434. It is noted that with the pumping power input being set at the operational pumping power input level 425, the laser power output of the MOPA system 112 increases stage-wise with each of the stages 432, 433 and 434. As the laser power output 410 reaches higher and near the operational laser output level 415, it can become more and more difficult to align the MOPA system 112 without triggering the safety interlock system 127. In some embodiments, the alignment performed at operation 306 includes a wider range and can be referred to as a coarse alignment and the alignments performed at operation 310 include narrower ranges and can be referred to as fine alignments or fine tuning. This coarse-to-fine alignment during the progression of method 300 is also illustrated in the changes of misalignment amount in stages 441, 442, 443, and 444 in line 440. As shown in FIG. 5, the amount of misalignment at time $t_1$ is smaller than the amount of misalignment at time $t_0$; the amount of misalignment at time $t_2$ is smaller than the amount of misalignment at time $t_1$; and the amount of misalignment at time $t_3$ is smaller than the amount of misalignment at time $t_2$. With the decrease of initial misalignment amount over the stages, the alignment needed to bring the MOPA system 112 to full alignment at each stage also decreases. In some embodiments, little or no alignment may be needed when the signal power output 430 is increased to level 434.

Figure 7:
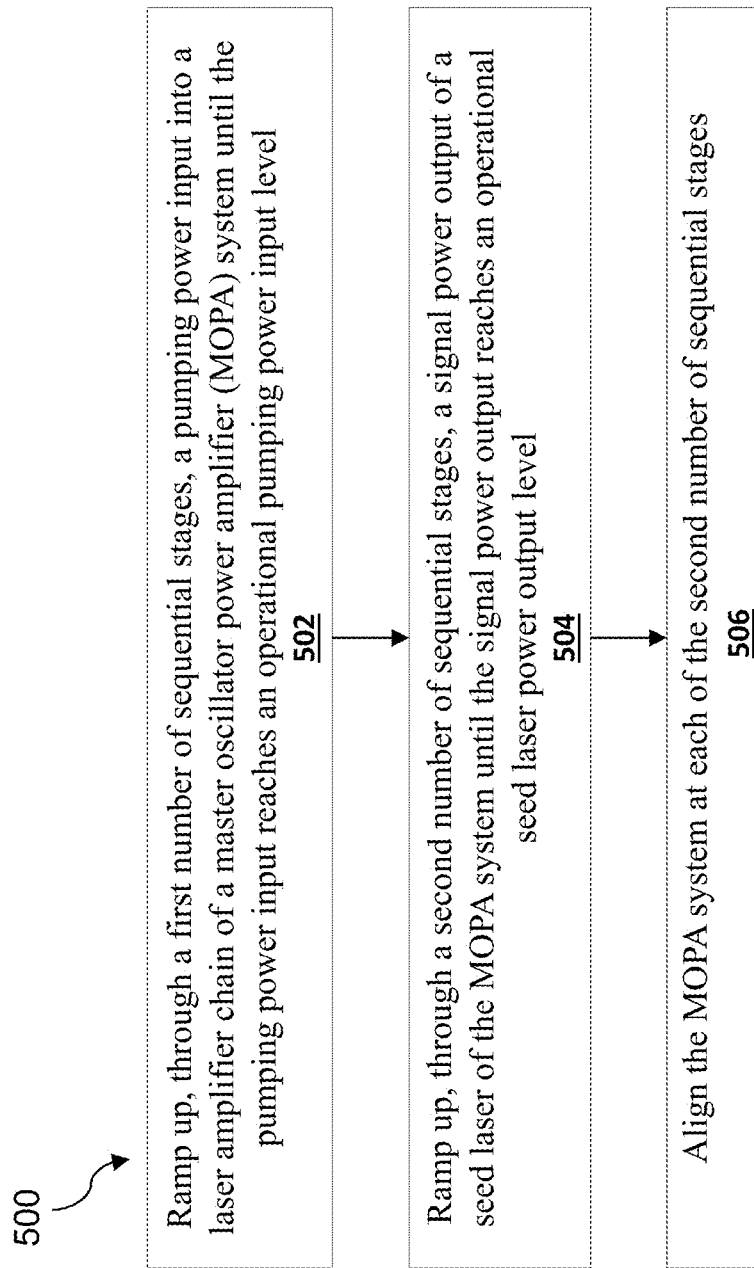
FIG. 7 is a flowchart illustrating another method for aligning a MOPA system, in accordance with some embodiments of the present disclosure.

FIG. 7 is a flowchart illustrating a method 500 for aligning the MOPA system 112 according to various aspects of the present disclosure. The method 500 is merely an example, and is not intended to limit the present disclosure beyond what is explicitly recited in the claims. Additional operations can be provided before, during, and after the method 500, and some of the operations described can be replaced, relocated, or eliminated for other embodiments of the method 500. The method 500 is described below in conjunction with FIGS. 1 and 8.

Reference is made to FIG. 8. At operation 502, the method 500 ramps up, through a first number of sequential stages 621, 622, 623, and 624, a pumping power input at the level (represented by line 620) into the laser amplifier chain 117 of the MOPA system 112 (FIG. 1) until the pumping power input represented by line 620 reaches an operational pumping power input level 625. Each of the subsequent-in-time stages includes a higher pumping power input level. For example, the pumping power input level of the stage 622 is higher than that of the stage 621. Similarly, the pumping power input level of the stage 623 is higher than that the stage 622 and the pumping power input level of the stage 624 is higher than that the stage 623. In the embodiment represented by FIG. 8, the four stages 621, 622, 623 and 624 are even stages with equal increase of pumping power input between stages. While there are four sequential stages 621, 622, 623, and 624 in the exemplary embodiment shown in FIG. 8, the present disclosure envisions ramping up the pumping power input 620 through any number of sequential stages. Due to practicality and to save time, in some embodiments, operation 502 can have 3 to 15 stages. Similar to method 300, method 500 seeks to align the MOPA system 112 while the MOPA system 112 experiences the "thermal lensing" effect due to the pumping power input and while the laser output of the MOPA system 112 is low. That is to say, for each of the first number of sequential stages 621, 622, 623, and 624, the pumping power input level 620 should be as high as possible, provided that self-lasing can be kept at a reasonable low level. Self-lasing can happen when residual gain in the laser amplifier chain 117 is too high to be extracted by the signal power output from the seed laser and is not desirable for that reason. In instances where there are multiple laser amplifiers 117 that receive pumping power input from different pump power sources, the pumping power input 620 stands for the total pumping power input to all of the multiple laser amplifiers 117. In addition, in those instances, the pumping power input into each of the laser amplifiers 117 remains unchanged or increases from one of the first number of sequential stages to the next of the first number of sequential stages with a higher total pumping power input 620.

At operation 504 of the method 500, a signal power output (represented by line 630) of the seed laser 118 of the MOPA system 112 is ramped up, through a second number of sequential stages 631, 632, 633, and 634, until the signal power output 630 reaches an operational seed laser power output level 635. Each of the subsequent-in-time stage includes a higher signal power output level. For example, the signal power output level of the stage 632 is higher than that of the stage 631. Similarly, the signal power output level of the stage 633 is higher than that the stage 632 and the signal power output level of the stage 634 is higher than that the stage 633. In the embodiment represented by FIG. 8, the four stages 631, 632, 633 and 634 are even stages with equal increase of signal power output between stages. As described above, method 500 seeks to align the MOPA system 112 while the MOPA system experiences the "thermal lensing" effect due to the pumping power input and while the laser output of the MOPA system 112 is low. That is to say, for each of the sequential stages 631, 632, 633, and 634, the pumping power input level should be as high as possible, provided that self-lasing can be kept at a reasonable low level. In some implementations, the initial signal power of seed laser output at the first sequential stage 631 is the mW range. In some instances, the initial signal power output at the first sequential stage 631 is below 100 mW. In some embodiments represented by FIG. 8, each of the second number of sequential stages 631, 632, 633, and 634 coincides in time with one of the first number of sequential stages 621, 622, 623, and 624. In those embodiments, each of the second number of sequential stages and its corresponding stage in the first sequential stage start at the same point in time and last the same duration of time. As shown in FIG. 8, stages 621 and 631 start at $t_0$ and end at $t_1$; stages 622 and 632 start at $t_1$ and end at $t_2$; stages 623 and 633 start at $t_2$ and end at $t_3$; stages 624 and 634 start at $t_3$ and end at the same point in time. While there are four sequential stages 631, 632, 633, and 634 in the exemplary embodiment shown in FIG. 8, the present disclosure envisions ramping up the signal power output 630 through any number of sequential stages. Due to practicality and to save time, in some embodiments, operation 504 can have 3 to 15 stages.

Similar to line 450 in FIG. 5, line 650 represents the system temperature that, in some instances, can be assessed by measuring the coolant temperature at the coolant output 125 of the cooling vessel 121. As the pumping power input 620 and the signal power output 630 increases through respective stages, the system temperature 650 may gradually decrease and finally plateau at each stage of 651, 652, 653, and 654. For example, at time $t_0$, the system temperature starts off at a high level due to pumping power input and gradually drops toward the end of line segment 651. Similarly, at $t_1$, the system temperature starts off at a locally high level due to the step increase of the pumping power input from level 621 to level 622 and gradually drops toward the end of the line segment 652. Line segments 653 and 654 may also follow the same trend.

At operation 506, the method 500 aligns the MOPA system 112 at each of the second number of sequential stages 631, 632, 633, and 634. As the laser power output (represented by 610) of the MOPA system 112 reaches higher with increase of power input and output signal power of the seed laser 118, it can become more and more difficult to align the MOPA system 112 without triggering the safety interlock system 127. In some embodiments, the alignment performed at stage 631 includes a wider range and can be referred to as a coarse alignment. On the contrary, the alignments performed at stages 632, 633 and 634 include narrower ranges and can be referred to as fine alignments or fine tuning. This coarse-to-fine alignment during the progression of method 500 is also illustrated in the changes of misalignment amount in stages 641, 642, 643, and 644 in line 640. As shown in FIG. 8, the amount of misalignment at time $t_1$ is smaller than the amount of misalignment at time $t_0$; the amount of misalignment at time $t_2$ is smaller than the amount of misalignment at time $t_1$; and the amount of misalignment at time $t_3$ is smaller than the amount of misalignment at time $t_2$. With the decrease of initial misalignment amount over the stages, the alignment needed to bring the MOPA system 112 to full alignment at each stage also decreases.

As described above with respect to FIG. 8, the four stages 621, 622, 623 and 624 are even stages with equal increase of pumping power input between stages and the four stages 631, 632, 633 and 634 are even stages with equal increase of signal power output between stages. In some embodiments represented by FIG. 9, method 500 can be modified such that both the pumping power input and the signal power output have larger increases in earlier stages than in later stages to further set apart coarse alignment and fine adjustments. As shown in FIG. 9, the pumping power input starts off at level 721. From level 721, the pumping power input 720 increases by an amount P1 to level 722, increases by an amount P2 to level 723, and then increases by an amount P3 to level 724. P1 is greater than P2 and P2 is greater than P3. In some implementations, P1, P2 and P3 are not uniform or are different from one another. In some embodiments, level 721 in FIG. 9 is greater than level 621 in FIG. 8. The signal power output 730 starts off at level 731. From level 731, the signal power output 730 increases by an amount S1 to level 732, increases by an amount S2 to level 733, and then increases by an amount S3 to level 734. S1 is greater than S2 and S2 is greater than S3. In some implementations, S1, S2 and S3 are not uniform or are different from one another. In some embodiments, level 731 in FIG. 9 is greater than level 631 in FIG. 8. The modification to method 500 shown in FIG. 9 may allow more coarse alignment to be done in early stages (e.g. 721/731, 722/732) as the system temperature fluctuates more and takes longer to stabilize in early stages and finer fine adjustment to be done in later stages (e.g. 723/733, 724/734) as the system can reach a steady thermal state faster in later stages. The modification illustrated in FIG. 9 may allow for a more efficient alignment of the MOPA system 112. It is noted that FIGS. 5, 8 and 9 are not drawn to scale and changes of each line therein are relative in nature and only meaningful with respect to the parameter it represents. Lines in each of FIGS. 5, 8 and 9 share the same time line.

In some embodiments, the EUV light generation system 100 can include a controller 140. The controller 140 includes hardware and software to execute methods 300 and 500. In some embodiments, the controller 140 is connected to a pumping power source, such as a RF power source, that supplies power to the laser amplifiers 117, a seed laser controller that controls and energizes the seed laser 118 and a temperature sensor disposed at the coolant outlet 125. The controller 140 can ramp up pumping power input into the laser amplifiers 117, ramp up signal power output of the seed laser 118, and monitor the temperature reading at the coolant outlet 125 to determine if the MOPA system 112 reaches a steady thermal state.

The various embodiments described herein offer several advantages over the existing art. It will be understood that not all advantages have been necessarily discussed herein, no particular advantage is required for all embodiments, and other embodiments may offer different advantages. For example, embodiments discussed herein provide systems and methods for aligning a MOPA system in steady thermal states, which systems and methods improve the reliability, precision and sustainability in aligning the MOPA system, prevent beam drifting, and increase availability of the MOPA system.

Thus, one of the embodiments of the present disclosure includes a method for aligning a master oscillator power amplifier (MOPA) system. The method includes ramping up a pumping power input into a laser amplifier chain of the MOPA system until the pumping power input reaches an operational pumping power input level; adjusting a seed laser power output of a seed laser of the MOPA system until the seed laser power output is at a first level below an operational seed laser power output level; and performing a first optical alignment process to the MOPA system while the pumping power input is at the operational pumping power input level, the seed laser power output is at the first level, and the MOPA system reaches a steady operational thermal state. In another of the embodiments, the method includes ramping up, through a first number of sequential stages, a pumping power input into a laser amplifier chain of a master oscillator power amplifier (MOPA) system until the pumping power input reaches an operational pumping power input level; ramping up, through a second number of sequential stages, a signal power output of a seed laser until the signal power output reaches an operational seed laser power output level; and aligning the MOPA system at each of the second number of sequential stages.

In yet another of the embodiments, the method includes ramping up, through a first number of ascending stages, a pumping power input into a laser amplifier chain of a master oscillator power amplifier (MOPA) system until the pumping power input reaches an operational pumping power input level; ramping up, through a second number of ascending stages, a signal power output of a seed laser from an initial level to an operational seed laser power output level, wherein the initial level is less than 100 mW; and aligning the MOPA system at each of the first number of ascending stages.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
ramping up a pumping power input into a laser amplifier chain of a master oscillator power amplifier (MOPA) system until the pumping power input reaches an operational pumping power input level;
adjusting a signal power output of a seed laser of the MOPA system until the signal power output is at a first level below an operational power output level;
performing a coarse optical alignment process to the MOPA system while the pumping power input is at the operational pumping power input level, the signal power output is at the first level, and the MOPA system reaches a steady thermal state; and
ramping up the signal power output of the seed laser from the first level to an operational power output level.

2. The method of claim 1, wherein the ramping up of the signal power output comprises a number of ascending stages.

3. The method of claim 2, further comprising:
performing a fine optical alignment process to the MOPA system at each of the number of ascending stages.

4. The method of claim 3, wherein a range of the coarse optical alignment process is greater than a range of the fine optical alignment process.

5. The method of claim 2, wherein a system temperature of the MOPA system decreases with the number of ascending stages.

6. The method of claim 1, wherein the first level is less than 100 mW.

7. The method of claim 1, wherein the operational power output level is between 100 W and 300 W.

8. The method of claim 1, wherein the first level is less than about 0.003% or about 0.01% of the operational power output level.

9. A method, comprising:
ramping up, through a first number of sequential stages, a pumping power input into a laser amplifier chain of a master oscillator power amplifier (MOPA) system until the pumping power input reaches an operational pumping power input level;
ramping up, through a second number of sequential stages, a signal power output of a seed laser until the signal power output reaches an operational seed laser power output level; and
aligning the MOPA system at each of the second number of sequential stages,
wherein each of the first number of sequential stages coincides, in time, with one of the second number of sequential stages.

10. The method of claim 9,
wherein an amount of increase of the pumping power input between a stage and a subsequent stage of the first number of sequential stages gradually decreases throughout the ramping up,
wherein an amount of increase of the signal power output between a stage and a subsequent stage of the second number of sequential stages gradually decreases throughout the ramping up.

11. The method of claim 10, wherein a pumping power input level of each of the first number of sequential stages and a signal power output level of each of the second number of sequential stages are selected such that the pumping power input level is maximized while self-lasing is minimized.

12. The method of claim 9, wherein the MOPA system is allowed to reach a steady thermal state at each of the first number of sequential stages.

13. The method of claim 9, further comprising:
irradiating, using the aligned MOPA system, a laser beam toward a target to generate extreme ultraviolet (EUV) radiation;
collecting and focusing, using a collector, the EUV radiation to serve as a radiation source for an EUV lithography system; and
patterning, using the EUV lithography system, a photoresist layer on a substrate.

14. The method of claim 13, wherein the target comprises tin or a tin compound.

15. The method of claim 9, wherein the first number of sequential stages and the second number of sequential stages comprise an identical number of sequential stages.

16. The method of claim 15, wherein the first number of sequential stages comprise 3 to 15 stages.

17. The method of claim 9,
wherein the MOPA system is surrounded by a cooling vessel,
wherein a coolant enters the cooling vessel at a coolant inlet and exits the cooling vessel at a coolant outlet.

18. The method of claim 17, wherein a temperature of the coolant at the coolant outlet during the ramping up of the signal power output of the seed laser decreases over the second number of sequential stages.

19. A method, comprising:
  ramping up a pumping power input into a laser amplifier chain of a master oscillator power amplifier (MOPA) system until the pumping power input reaches an operational pumping power input level;
  adjusting a signal power output of a seed laser of the MOPA system until the signal power output is at a first level below an operational power output level;
  performing a coarse optical alignment process to the MOPA system while the pumping power input is at the operational pumping power input level, the signal power output is at the first level, and the MOPA system reaches a steady thermal state;
  ramping up, through a number of ascending stages, the signal power output of the seed laser from the first level to an operational power output level;
  performing a fine optical alignment process to the MOPA system at each of the number of ascending stages to obtain an aligned MOA system;
  irradiating, using the aligned MOPA system, a laser beam toward a target to generate extreme ultraviolet (EUV) radiation;
  collecting and focusing, using a collector, the EUV radiation to serve as a radiation source for an EUV lithography system; and
  patterning, using the EUV lithography system, a photoresist layer on a substrate.

20. The method of claim 19, wherein the MOPA system is allowed to reach a steady thermal state at each of the number of ascending stages.

* * * * *